Feb. 28, 1967  J. JARRET ETAL  3,306,598
HYDROSTATIC COMPRESSION SPRINGS USING ELASTOMERS
Filed Dec. 4, 1964
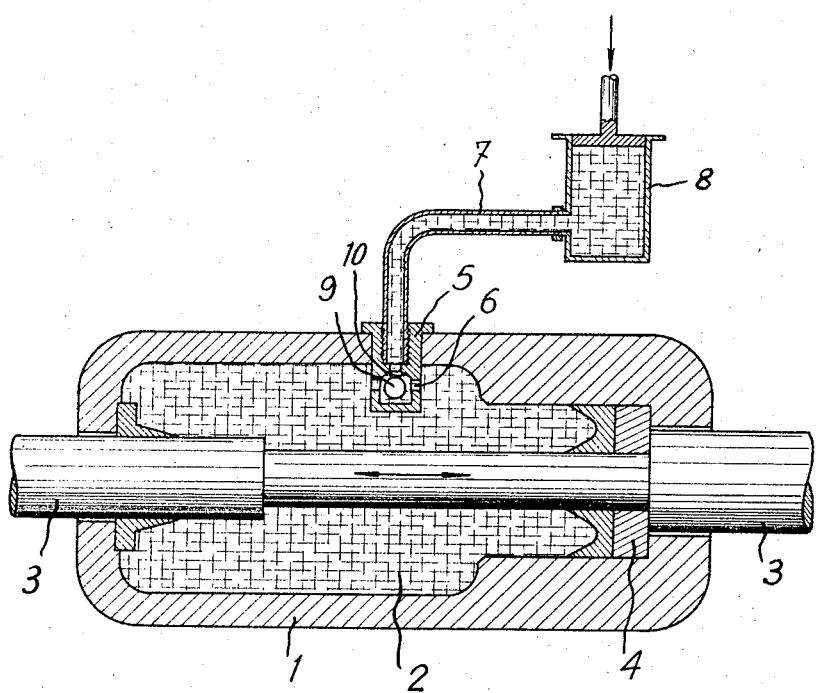

United States Patent Office 3,306,598
Patented Feb. 28, 1967

3,306,598
HYDROSTATIC COMPRESSION SPRINGS USING ELASTOMERS
Jean Jarret, Fourqueux, and Jacques Jarret, Le Vesinet, France, assignors to Société d'Exploitation des Ressorts Auto-Amortisseurs Jarret, Paris, France, a French company
Filed Dec. 4, 1964, Ser. No. 415,979
Claims priority, application France, Dec. 6, 1963, 956,267
2 Claims. (Cl. 267—1)

This invention relates to compression springs, and more particularly to hydrostatic springs employing elastomers.

It is generally recognized that it is possible to store large quantities of energy by the compression of an elastomer. To this end, one may fill a fluid-tight metallic envelope with a suitable elastomer and then vary the capacity of the envelope, thereby compressing the elastomer. This variation may be achieved, for example, by the movement of a rigid piston into the interior of the envelope.

This arrangement makes it possible to construct springs, abutments, buffers, etc., possessing remarkable characteristics, particularly when the maximum pressures applied to the elastomers attain several thousands of kilograms per square centimeter.

However, conventional hydrostatic springs present the drawback of not possessing a large and accurately predictable elastic strength (i.e., variation of reaction force per unit length of linear compression) until the piston has moved a certain distance into the envelope. This is true because (1) it is difficult to construct a hydrostatic elastomer compression spring in which the elastomer initially fills the entire interior of the envelope and, (2) the temperature coefficient of expansion of the elastomer being generally superior to that of the material of the envelope, which is usually metal, a drop in temperature causes the elastomer to shrink to a greater degree than does the envelope. As a result, the hydrostatic compression of the elastomer only commences after the piston has moved a certain distance, the beginning of compression corresponding to a variable piston position dependent upon the temperature, the care with which the envelope was initially filled, and the losses of elastomer produced by the operation of the particular device. Therefore, the position of the piston after any type of shock, compression, or tension is uncertain and this often constitutes a serious hindrance to certain applications of such devices.

In order to eliminate these drawbacks, the present invention proposes to apply an initial pressure to the elastomer, which pressure will exist throughout the entire elastomer mass prior to the commencement of piston movement. The value of this initial pressure is generally chosen so as to be between 1% and 20% of the maximum expected compression pressure. For example, in a buffer for a railway vehicle wherein the elastomer may be subjected to a maximum pressure of 3,000 kg./cm.², an initial pressure of 30 to 600 kg./cm.² may be effectively used. This insures that the elastomer will initially occupy the total interior volume of the envelope, with temperature changes and small elastomer losses only resulting in a variation of the initial pressure and not in a change in the piston position.

In order to construct such a spring, in which the elastomer is initially compressed, the interior of a metallic envelope is filled, in the usual manner and as well as possible, with a suitable elastomer. Then, with the piston in a position corresponding to the maximum capacity of the envelope, there is injected into the envelope, and under pressure, a supplementary quantity of elastomer generally having a volume of between 0.1% and 1.0% of the interior envelope volume. This injection can be carried out by, for example, an extrusion machine or with the aid of a pump chamber within which a piston moves. The injection is made through a suitable one-way valve (a ball valve, for example) which serves to prevent a pressure drop in the envelope when the injection apparatus is withdrawn.

These and other objects, features and advantages of the present invention will become more readily apparent from the following detailed description when taken together with the attached drawing the single figure of which shows a partially schematic, longitudinal cross-sectional view of a preferred embodiment of the invention.

The figure shows a "traction-impact" buffer comprising a metallic envelope 1 filled with an elastomer 2 which, in operation, will be compressed by the displacement of piston 3 and, eventually, of sleeve 4. The envelope 1 is cylindrical and is furnished with an opening filled by a valve unit 5. One end of this valve is furnished with a series of openings 6 in communication with the interior of envelope 1 and the other end of the valve is connected to a tubing 7 which is filled with elastomer and which communicates with the variable-volume chamber of a pump 8 which is also filled with elastomer.

Within valve unit 5 is disposed a ball valve 9 which is urged against its seating 10 by the pressure existing within envelope 1.

With the piston 3 in its position corresponding to the maximum capacity of envelope 1, pump 8 compresses the elastomer contained therein under a relatively high pressure (400 kg./cm.², for example). This compression causes the ball 9 to move away from its seating 10 so that a small quantity of elastomer can pass into envelope 1 and thereby transmit the high pressure to the elastomer mass 2. When the pressure of the elastomer within envelope 1 has achieved the desired value, tubing 7 may be unscrewed from valve unit 5, with the ball 9 automatically moving against seating 10 and thus sealing the interior of envelope 1. If desired, a suitable cap may then be screwed into the valve unit to provide a permanent seal.

When envelope 1 is filled in this manner the result is a compression spring in which the elastomer fills the entire available volume so that the compression transmitting piston will always return to a predetermined rest position.

While one preferred embodiment of the present invention has been shown and described herein, it should be appreciated that many modifications and variations may be made thereto without departing from the spirit of the invention and that its coverage should therefore only be limited by the scope of the appended claims.

What we claim is:
1. A hydrostatic compression spring comprising, in combination:
 (a) a rigid envelope;
 (b) a piston mounted in said envelope in a movable manner so that when said piston is subjected to a compression force it moves into the region enclosed by said envelope;
 (c) an elastomer mass disposed within the region enclosed by said envelope and subjected to an initial pressure sufficient to cause it to completely fill said region when said piston is not subjected to a compression force;
the invention being characterized by:
 (d) a valve unit mounted on said envelope so that one end of said unit communicates with the space outside said envelope and the other end thereof communicates directly with the region inside said envelope;

(e) a source of supplementary elastomer disposed outside of said envelope and detachably connected to the end of said valve unit that communicates with the space outside said envelope, and (f) one-way valve means within said valve unit to permit the passage of elastomer therethrough into said envelope while preventing the passage of elastomer out of said envelope.

2. The combination as recited in claim 1 further comprising:

(g) pressure applying means operatively associated with said source for placing said supplementary elastomer under pressure so as to force a small quantity thereof to pass through said valve and into the region enclosed by said envelope.

References Cited by the Examiner

UNITED STATES PATENTS

| | | | |
|---|---|---|---|
| 2,111,792 | 3/1938 | Laugaudin | 267—65 |
| 2,668,049 | 2/1954 | Taylor | 267—64 |
| 2,681,800 | 6/1954 | Taylor | 267—64 |
| 2,956,796 | 10/1960 | Devillers | 267—65 |
| 3,152,798 | 10/1964 | Janet et al. | 267—1 |

ARTHUR L. LA POINT, *Primary Examiner.*

R. M. WOHLFARTH, *Assistant Examiner.*